(12) United States Patent
Choi et al.

(10) Patent No.: US 9,827,849 B2
(45) Date of Patent: Nov. 28, 2017

(54) FUEL TANK

(71) Applicant: Hyundai Motor Company, Seoul (KR)

(72) Inventors: Pil Seon Choi, Anyang-Si (KR); Bu Yeol Ryu, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 199 days.

(21) Appl. No.: 14/943,238

(22) Filed: Nov. 17, 2015

(65) Prior Publication Data

US 2017/0066320 A1 Mar. 9, 2017

(30) Foreign Application Priority Data

Sep. 9, 2015 (KR) .......................... 10-2015-0127736

(51) Int. Cl.
| | |
|---|---|
| *F02M 33/02* | (2006.01) |
| *B01D 53/02* | (2006.01) |
| *B60K 15/03* | (2006.01) |
| *B01D 46/00* | (2006.01) |
| *F17C 11/00* | (2006.01) |

(52) U.S. Cl.
CPC .... *B60K 15/03006* (2013.01); *B01D 46/0023* (2013.01); *F17C 11/005* (2013.01); *F17C 11/007* (2013.01); *B60K 2015/03236* (2013.01); *B60K 2015/03315* (2013.01); *B60K 2015/03493* (2013.01); *F17C 2205/0341* (2013.01); *F17C 2205/0388* (2013.01)

(58) Field of Classification Search
CPC .... B60K 15/03006; B60K 2015/03236; B60K 2015/03315; B60K 2015/03493; F17C 11/005; F17C 11/007; F17C 2205/0341; F17C 2205/0388; F17C 2205/0391; F17C 2205/0394; B01D 46/0023; B01D 46/2403; B01D 46/4272
USPC ............................................ 123/519; 96/126
See application file for complete search history.

(56) References Cited

U.S. PATENT DOCUMENTS

| | | | |
|---|---|---|---|
| 2001/0035281 A1 | 11/2001 | Fujita et al. | |
| 2014/0205474 A1 | 7/2014 | Nakamura et al. | |
| 2014/0290751 A1 | 10/2014 | Dailly et al. | |

FOREIGN PATENT DOCUMENTS

| | | |
|---|---|---|
| JP | 2005-273717 A | 10/2005 |
| JP | 2006-029396 A | 2/2006 |
| JP | 2007-167820 A | 7/2007 |
| JP | 2008-151219 A | 7/2008 |
| JP | 2010-529370 A | 8/2010 |
| KR | 10-0961994 B1 | 5/2010 |
| KR | 10-2014-0128038 A | 11/2014 |
| WO | WO 2013/018570 A1 | 2/2013 |
| WO | WO 2015/017844 A1 | 2/2015 |

*Primary Examiner* — Syed O Hasan

(74) *Attorney, Agent, or Firm* — Morgan, Lewis & Bockius LLP

(57) ABSTRACT

A fuel tank may include a housing having an inner space formed therein and including a nozzle part formed at a side thereof to introduce fuel thereinto, an adsorber provided within the housing and configured to store fuel introduced through the nozzle part by adsorption, a diffuser located between the nozzle part and the adsorber within the housing and configured to diffuse the fuel introduced through the nozzle part and then to supply the fuel to the adsorber, and a filter unit located between the diffuser and the adsorber and configured to filter out foreign substances from the fuel diffused by the diffuser.

9 Claims, 5 Drawing Sheets

FUEL TANK

CROSS-REFERENCE TO RELATED APPLICATION

The present application claims the priority benefit of Korean Patent Application No. 10-2015-0127736, filed Sep. 9, 2015, the disclosure of which is incorporated herein by reference.

BACKGROUND OF THE INVENTION

Field of the Invention

The present invention relates to a fuel tank which lowers pressure, when compressed natural gas or hydrogen gas is stored, to assure stability and to improve fuel adsorption efficiency.

Description of Related Art

In general, a high pressure vessel, such as a fuel tank of a natural gas vehicle or a hydrogen tank of a fuel cell vehicle, compresses natural gas or hydrogen gas fuel to a high pressure and then stores the compressed fuel. A high pressure vessel decompresses compressed fuel received therein and then provides decompressed fuel as fuel necessary for an engine.

Recently, as natural gas and hydrogen gas receive attention as future energy resources, development of vehicles driven using natural gas or hydrogen gas has been carried out. However, since, to store a sufficient amount of natural gas or hydrogen gas, fuel needs to be compressed to a high pressure and then stored, high pressure vessels require sufficient durability and, thus, high-priced high pressure vessels in consideration of material and stiffness have been produced.

To solve a problem, a high pressure vessel to store natural gas or hydrogen gas using an adsorbent has been developed. Thereby, according to lowering of storage pressure when natural gas or hydrogen gas is stored, manufacture of a high pressure vessel in consideration of material and stiffness is not greatly restricted and the danger of explosion due to accidents is greatly lowered.

However, in a high pressure vessel using an adsorbent, adsorption efficiency is important. However, techniques to improve adsorption efficiency are insufficient and there are many problems in application of such techniques to actual vehicles.

Therefore, a technique to improve adsorption efficiency of an adsorbent is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fuel tank for adsorbing and storing compressed natural gas or hydrogen gas, which improves adsorption efficiency.

In accordance with the present invention, the above and other objects can be accomplished by the provision of a fuel tank including a housing having an inner space formed therein and including a nozzle part formed at one side thereof to introduce fuel thereinto, an adsorber provided within the housing and configured to store fuel introduced through the nozzle part by adsorption, a diffuser located between the nozzle part and the adsorber within the housing and configured to diffuse the fuel introduced through the nozzle part and then to supply the fuel to the adsorber, and a filter unit located between the diffuser and the adsorber and configured to filter out foreign substances from the fuel diffused by the diffuser.

The housing may include a vessel part having both opened sides and an inner space formed therein such that the adsorber is provided within the inner space, a lid part combined with one opened side of the vessel part and provided with the nozzle part, and a closure part combined with the other opened side of the vessel part to close the inner space.

A partition extending in the length direction may be provided within the housing so as to divide the inner space into sub-spaces.

The partition may be continuously formed in a lattice or honeycomb structure within the inner space of the housing.

The fuel introduced through the nozzle part may be natural gas or hydrogen gas, and the adsorber may be formed of a material adsorbing natural gas or hydrogen gas.

The nozzle part of the housing may be installed at the center of the housing, the diffuser may be fixed to the inside of the housing, and a diffusion protrusion may protrude from a part of the diffuser facing the nozzle part towards the nozzle part.

A plurality of diffusion holes formed at the center of the diffusion protrusion and separated from each other by equal angles from the diffusion protrusion may be formed on the diffuser.

The diffusion holes of the diffuser may be configured such that the sizes of the diffusion holes are gradually increased in the radial direction from the center of the diffuser.

The diffuser may be located between the nozzle part and the adsorber so as to be separated from the nozzle part and the adsorber by designated distances.

The filter unit may include a first filter provided at one side of the adsorber and a second filter provided at the other side of the adsorber.

The first filter may be located between the diffuser and the adsorber and contact one side of the adsorber, and the second filter may be located at the other side of the adsorber, elastically supported in one sideward direction by an elastic support device provided at the other side of the housing, and closely adhered to the other side of the adsorber.

The elastic support device may include a reinforcing plate located at the other side of the second filter and including a plurality of through holes, and an elastic body provided at the other side of the reinforcing plate and pushing the reinforcing plate in one sideward direction.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
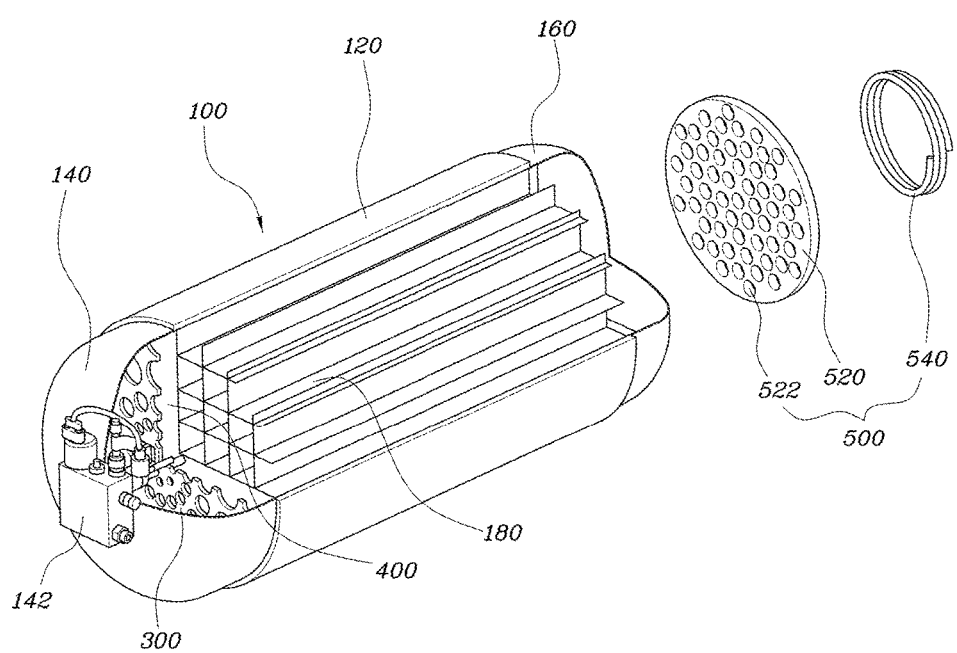
FIG. 1 is a perspective view illustrating a fuel tank in accordance with one embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a fuel tank in accordance with one embodiment of the present invention will be described with reference to the accompanying drawings.

Figure 2:
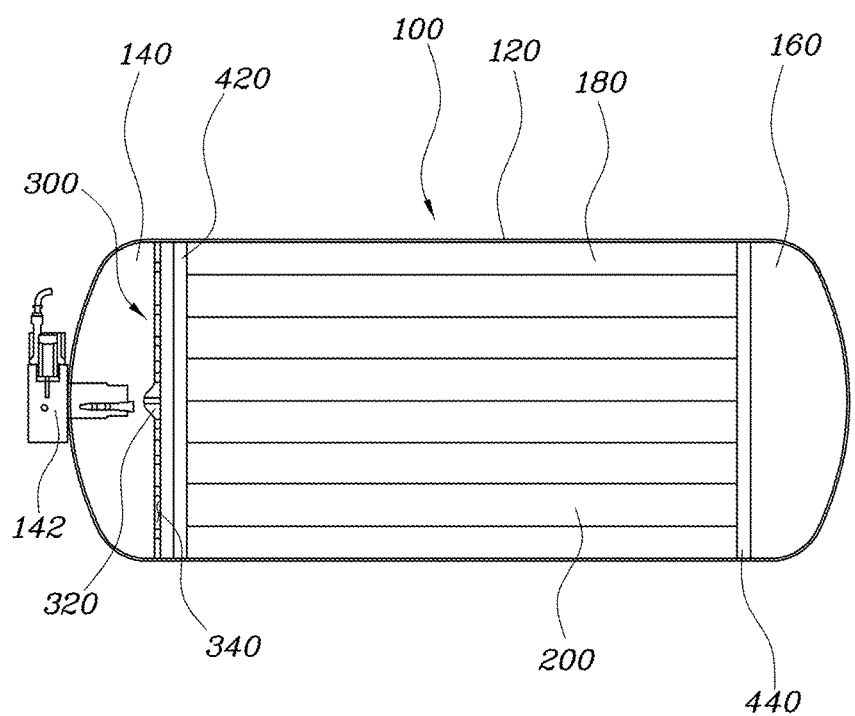
FIG. 2 is a side view of the fuel tank shown in FIG. 1.
Figure 3:
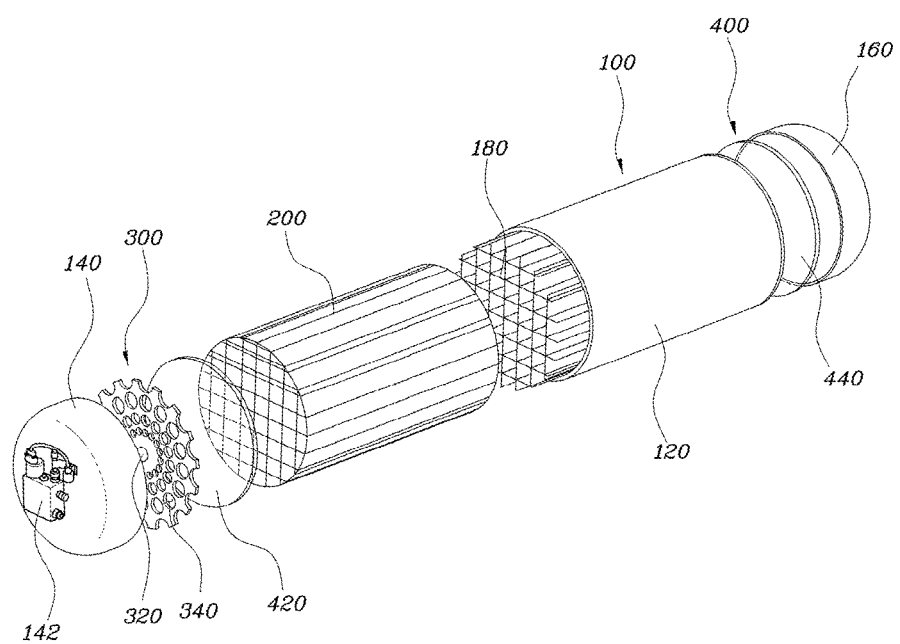
FIG. 3 is an exploded perspective view of the fuel tank shown in FIG. 1.
Figure 4:
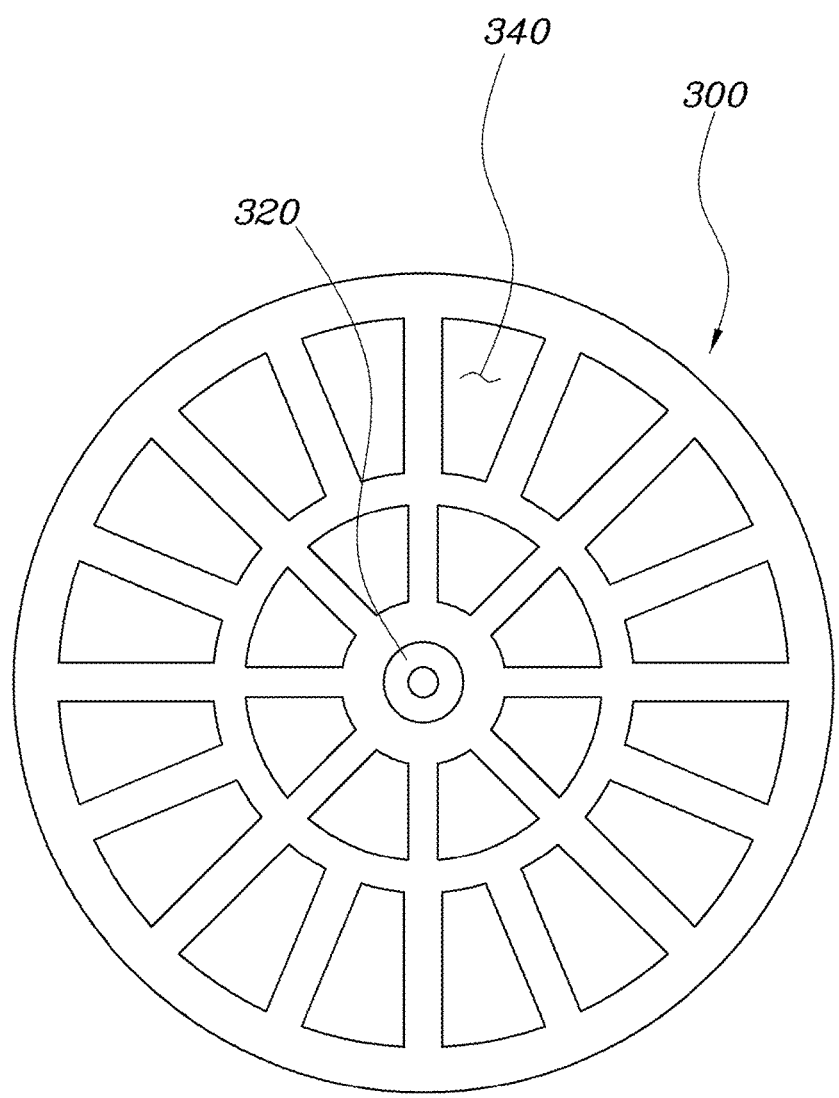
FIGS. 4 and 5 are views illustrating various exemplary diffusers of the fuel tank shown in FIG. 1._
Figure 5:
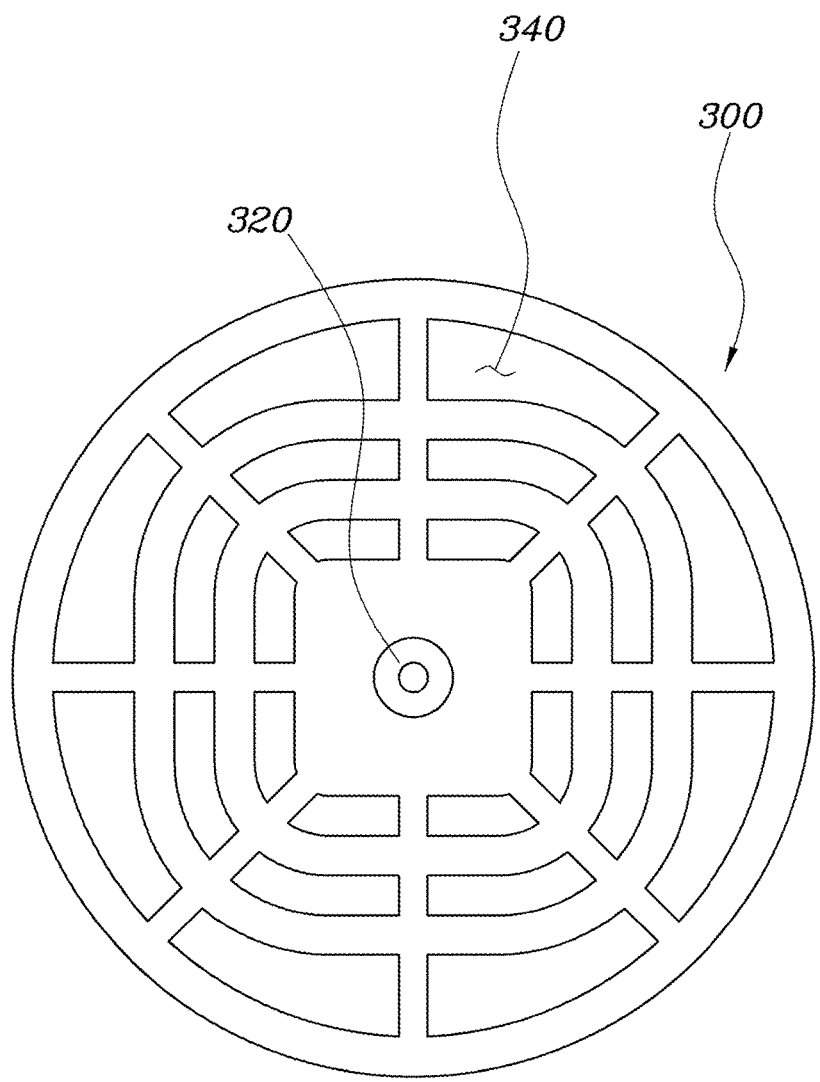

FIG. 1 is a perspective view illustrating a fuel tank in accordance with one embodiment of the present invention, FIG. 2 is a side view of the fuel tank shown in FIG. 1, FIG. 3 is an exploded perspective view of the fuel tank shown in FIG. 1, and FIGS. 4 and 5 are views illustrating various exemplary diffusers of the fuel tank shown in FIG. 1.

As exemplarily shown in FIGS. 1 to 3, the fuel tank in accordance with the present invention includes a housing 100 having an inner space formed therein and including a nozzle part 142 provided at one side thereof to introduce fuel thereinto, an adsorber 200 provided within the housing 100 and adsorbing and storing fuel introduced through the nozzle part 142, a diffuser 300 located between the nozzle part 142 and the adsorber 200 within the housing 100, diffusing the fuel introduced through the nozzle part 142 and supplying the fuel to the adsorber 200, and a filter unit 400 located between the diffuser 300 and the adsorber 200 and filtering out foreign substances from the fuel diffused by the diffuser 300.

Here, the housing 100 has high strength. In an exemplary embodiment of the present invention, since the adsorber 200 stores fuel by adsorption and storage pressure of the fuel is greatly lowered, as compared to a conventional method for compressing fuel to a high pressure, the housing 100 may be formed of a carbon composite or plastic. That is, conventionally, in order to assure high strength, a fuel tank is formed of a steel and includes a reinforcing member and thus has increased weight and high manufacturing costs but, on the other hand, in an exemplary embodiment of the present invention, as storage pressure of fuel is lowered, strength of the housing 100 may be set to be lower than that of the conventional fuel tank and thus the housing 100 may be formed of a material having a relatively low strength. Carbon fiber may be wound on the outer circumferential surface of the housing 100 so as to increase the strength of the housing 100.

In more detail, the housing 100 may include a vessel part 120 having both sides, which are opened, and an inner space formed therein such that the adsorber 200 is provided in the inner space, a lid part 140 combined with one opened side of the vessel part 120 and provided with the nozzle part 142, and a closure part 160 combined with the other opened side of the vessel part 120 and closing the inner space.

That is, since the housing 100 includes the vessel part 120 having both opened sides and the lid part 140 and the closure part 160 respectively closing both opened sides of the vessel part 120, the adsorber 200 is easily inserted into the housing 100 and, when the adsorber 200 fails, is easily replaced with a new one. Particularly, the conventional fuel tank needs to be integrally formed by molding so as to withstand a high pressure because fuel within the conventional fuel tank is compressed to the high pressure conventionally but, the fuel tank in accordance with the present invention stores fuel by adsorption and lowers storage pressure of the fuel and thus the housing 100 may include the vessel part 120, the lid part 140 and the closure part 160, which are separately formed. By separately forming the housing 100 into the vessel part 120, the lid part 140 and the closure part 160, combination between these parts may be easily carried out.

As exemplarily shown in FIG. 1, a partition 180 extending in the length direction may be provided within the housing 100, thus dividing the inner space into sub-spaces.

By providing the partition 180 within the inner space of the housing 100, the partition 180 may support the housing 100 and thus assure stiffness. Further, the partition 180 provided within the housing 100 divides the inner space into the respective sub-spaces and the sub-spaces are filled with the adsorber 200, thereby causing fuel diffused by the diffuser 300, which will be described later, to be uniformly adsorbed in the adsorber 200 within the respective sub-spaces.

Here, the partition 180 may be continuously formed in a lattice or honeycomb structure within the inner space of the housing 100 and thus divide the inner space into uniform-shaped sub-spaces.

Fuel introduced through the nozzle part 142 may be natural gas or hydrogen gas and the adsorber 200 may be formed of a material which may adsorb natural gas or hydrogen gas.

The adsorber 200 having a fine particle shape may be formed directly within the housing 100, or the adsorber 200 having the shape of the inner space of the housing 200 may be formed by molding and then inserted into the housing 100. Further, the adsorber 200 may be formed of a material which may adsorb natural gas or hydrogen gas, i.e., carbon, carbon fiber, a metal-organic framework (MOF), zeolite, etc., and these adsorbent materials may be selectively used according to kinds of fuel.

The nozzle part 142 of the housing 100 may be installed at the center of the housing 100. Here, as the housing 100 of the present invention has a cylindrical shape, the nozzle part 142 is installed at the center of the circular lid part 140 so as not to incline the fuel introduced through the nozzle part 142 towards any one side.

Particularly, the diffuser 300 may be fixed to the inside of the housing 100 and a diffusion protrusion 320 may protrude from a part of the diffuser 200 facing the nozzle part 142 towards the nozzle part 142. By forming the diffusion protrusion 320 at the center of the diffuser 300, fuel supplied from the nozzle part 142 is not concentrated on the center of the diffuser 300 but may be radially diffused by the diffusion protrusion 320.

As exemplarily shown in FIG. 3, a plurality of diffusion holes 340 separated from each other by equal angles from the center of the diffuser 300 having the diffusion protrusion 320 is formed on the diffuser 300 so as to cause fuel diffused by the diffusion protrusion 320 to flow into the adsorber 200 via the diffusion holes 340. The diffusion holes 340 of the diffuser 300 may be configured such that the sizes of the diffusion holes 340 are gradually increased in the radial direction from the center of the diffuser 300 and thus fuel introduced through the nozzle part 142 is transmitted to the center of the diffuser 300 and radially diffused by the diffusion protrusion 320. Here, since the diffusion holes 340 formed close to the center of the diffuser 300 having the diffusion protrusion 320 have a small size, some portions of the fuel may be effectively diffused radially and thus supplied to the adsorber 200 through other diffusion holes 340. Thereby, the fuel transmitted to the diffuser 300 through the nozzle part 142 may be uniformly diffused by the diffuser 300, when the fuel passes through the diffuser 300, and then transmitted to the adsorber 200, thus being uniformly adsorbed in the overall adsorber 200.

The diffuser 300, as exemplarily shown in FIGS. 4 and 5, a diffusion hole 340 may be also formed at the diffusion protrusion 320 and the diffusion holes 340 having a specific shape may be radially disposed.

The diffuser 300 may be located between the nozzle part 142 and the adsorber 200 and separated from the nozzle part 142 and the adsorber 200 by designated distances. By locating the diffuser 300 between the nozzle part 142 and the adsorber 200 so as to be separated from the nozzle part 142 and the adsorber 200 by designated distances, fuel introduced through the nozzle part 142 may be naturally dispersed and then more uniformly diffused by the diffuser 300 and fuel diffused by the diffuser 300 may be naturally diffused again, supplied to the adsorber 200 and uniformly adsorbed in the overall adsorber 200.

The filter unit 400 may include a first filter 420 provided at one side of the adsorber 200 and a second filter 440 provided at the other side of the adsorber 200. By providing the first filter 420 and the second filter 440 at both sides of the adsorber 200, fuel introduced through the nozzle part 142 may be filtered by the first filter 420 so as to remove foreign substances from the fuel and then supplied to the adsorber 200, and fuel having passed through the adsorber 200 may be filtered again by the second filter 440. Here, the second filter 440 may serve not only to filter out foreign substances from fuel but also to block movement of the fuel so as to prevent the fuel from passing through the other side of the adsorber 200 so that the fuel may stay in the adsorber 200.

The first filter 420 may be located between the diffuser 200 and the adsorber 200 and contact one side of the adsorber 200, and the second filter 440 may be located at the other side of the adsorber 200, elastically supported in one sideward direction by an elastic support device 500 provided at the other side of the housing 100, and closely adhered to the other side of the adsorber 200. That is, the first filter 420 contacts one side of the adsorber 200 and filters out foreign substances from fuel supplied through the nozzle part 142, and the second filter 440 contacts the other side of the adsorber 200 and filters out foreign substances from fuel having passed through the adsorber 200.

Here, since the second filter 440 is elastically supported in one sideward direction by the elastic support device 500, movement of the adsorber 200 may be prevented and the second filter 400 may be closely adhered to the other side of the adsorber 200.

In more detail, as exemplarily shown in FIG. 1, the elastic support device 500 may include a reinforcing plate 520 located at the other side of the second filter 440 and including a plurality of through holes 522, and an elastic body 540 provided at the other side of the reinforcing plate 520 and pushing the reinforcing plate 520 in one sideward direction. That is, the elastic body 540 including an elastic spring is provided at the other side of the inside of the housing 100 and the reinforcing plate 520 elastically supported in one sideward direction by the elastic body 540 pushes the second filter 440 in one sideward direction so as to adhere the second filter 440 closely to the other side of the adsorber 200. Here, the through holes 522 are formed on the reinforcing plate 520 so that fuel having passed through the second filter 440 may smoothly move via the through holes 522, and the through holes 522 may have various shapes, such as a circular or rectangular shape. By adhering the second filter 440 closely to the other side of the adsorber 200 through such an elastic support device 500, damage to the adsorber 200 caused by movement may be prevented.

As is apparent from the above description, a fuel tank having the above-described structure may store compressed natural gas or hydrogen gas by adsorption and thus lower storage pressure.

Further, a diffuser 300 may diffuse compressed natural gas or hydrogen gas, introduced into the housing 100, and uniformly supply the gas to an adsorber 200 and thus improve adsorption efficiency, and the adsorber 200 may be stably supported and durability thereof may assured.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of predetermined exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel tank comprising: a housing having an inner space formed therein and including a nozzle part formed at a first side thereof to introduce fuel thereinto; an adsorber provided within the housing and configured to store fuel introduced through the nozzle part by adsorption; a diffuser located between the nozzle part and the adsorber within the housing and configured to diffuse the fuel introduced through the nozzle part and then to supply the fuel to the adsorber; and a filter unit located between the diffuser and the adsorber and configured to filter out foreign substances from the fuel diffused by the diffuser, wherein the fuel introduced through the nozzle part is natural gas or hydrogen gas; and the adsorber is formed of a material adsorbing natural gas or hydrogen gas, wherein the nozzle part of the housing is installed at the center of the housing; and the diffuser is fixed to the inside of the housing and a diffusion protrusion protrudes from a part of the diffuser facing the nozzle part towards the nozzle part, and wherein a plurality of diffusion holes formed at the center of the diffusion protrusion and separated from each other by equal angles from the diffusion protrusion is formed on the diffuser.

2. The fuel tank according to claim 1, wherein the housing includes a vessel part having both opened sides and an inner space formed therein such that the adsorber is provided within the inner space, a lid part combined with a first opened side of the vessel part and provided with the nozzle part, and a closure part combined with a second opened side of the vessel part to close the inner space.

3. The fuel tank according to claim 1, wherein a partition extending in a length direction is provided within the housing to divide the inner space into sub-spaces.

4. The fuel tank according to claim 3, wherein the partition is continuously formed in a lattice or honeycomb structure within the inner space of the housing.

5. The fuel tank according to claim 1, wherein the diffusion holes of the diffuser are configured such that the sizes of the diffusion holes are gradually increased in the radial direction from the center of the diffuser.

6. The fuel tank according to claim 1, wherein the diffuser is located between the nozzle part and the adsorber to be separated from the nozzle part and the adsorber by designated distances.

7. The fuel tank according to claim 1, wherein the filter unit includes a first filter provided at a first side of the adsorber and a second filter provided at a second side of the adsorber.

8. The fuel tank according to claim 7, wherein the first filter is located between the diffuser and the adsorber and contacts the first side of the adsorber, and the second filter is located at the second side of the adsorber, elastically supported in a sideward direction by an elastic support device provided at a second side of the housing, and closely adhered to the second side of the adsorber.

9. The fuel tank according to claim 8, wherein the elastic support device includes a reinforcing plate located at a second side of the second filter and including a plurality of through holes, and an elastic body provided at a first side of the reinforcing plate and pushing the reinforcing plate in a sideward direction.

* * * * *